Aug. 16, 1932.                C. J. COBERLY                1,872,409
TORCH TIP
Filed April 15, 1930
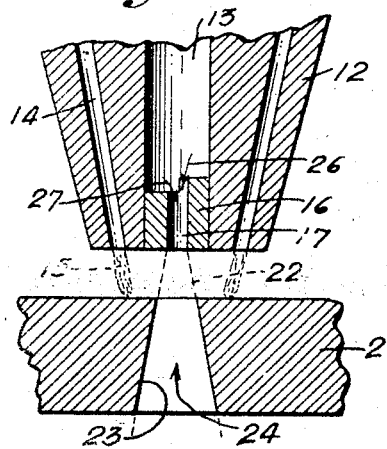
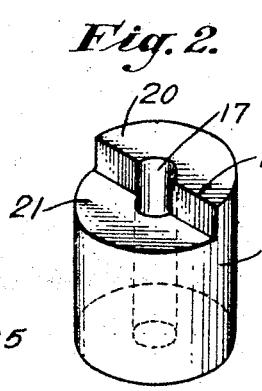
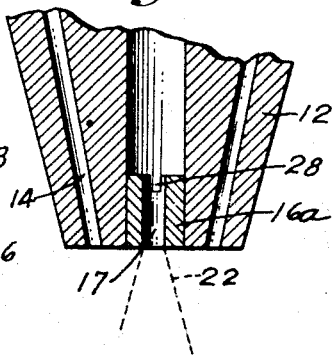
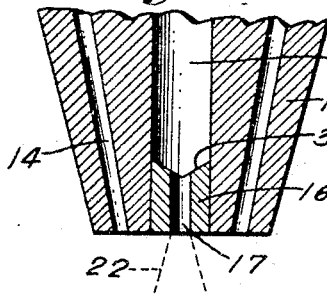
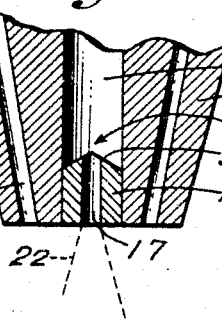
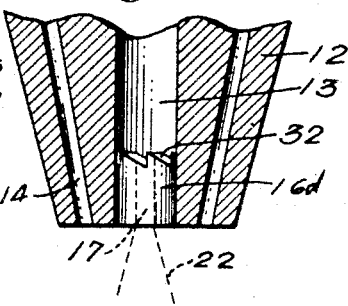
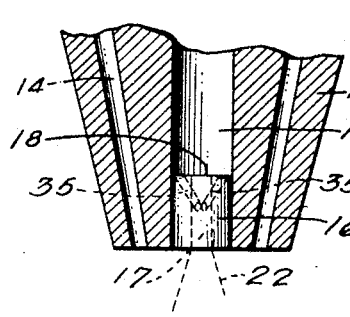
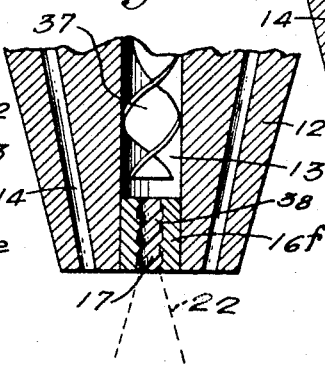
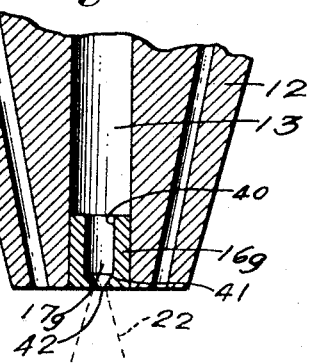
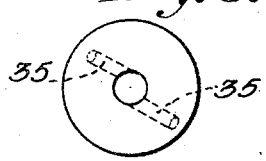
INVENTOR:
Clarence J. Coberly.
BY
ATTORNEY.

Patented Aug. 16, 1932

1,872,409

UNITED STATES PATENT OFFICE

CLARENCE J. COBERLY, OF LOS ANGELES, CALIFORNIA, ASSIGNOR TO KOBE, INC., OF HUNTINGTON PARK, CALIFORNIA, A CORPORATION OF CALIFORNIA

TORCH TIP

Application filed April 15, 1930. Serial No. 444,491.

My invention relates to the art of cutting metal by use of a gas jet and relates particularly to a cutting torch tip which will issue a diverging metal cutting jet. In the art of making well screen from pipe, or tubing, to which my present invention has its principal application, slots are cut in the tubular member through which fluids may flow into the interior of the pipe from the fluid bearing earth formations when the slotted pipe, or screen, is set in a well. In order to prevent clogging of the slots it is essential that the walls of the slot diverge inwardly in order that any particle of sand, or gravel, which has entered the mouth of the slot may pass clearly therethrough, thus keeping the slot clear by avoiding the accumulation of sand therein.

In order to produce slots having inwardly diverging walls the practice of cutting slots by use of an oxygen jet employs a cutting torch tip adapted to deliver or produce a diverging jet of cutting gas, crossing jets of cutting gas, or a rotating angularly directed jet of cutting gas.

My present invention concerns an extremely simple form of cutting torch jet having simple means therein for causing divergence of the jet of oxygen, or other metal cutting gas, issuing from the tip. I have found that turbulence produced in a flow of gas just before its issue from the discharge mouth of the cutting tip will cause the issuing jet to diverge, and that this divergence may be controlled through the turbulence itself thereby making it possible to produce a cutting jet which will cut a slot having side walls disposed at the desired angle of divergence.

It is an object of the invention to provide a cutting torch tip having a gas passage and means disposed within and adjacent to the discharge end of the gas passage for producing turbulence in the flow of gas and divergence of the gas jet which issues from the torch tip.

A further object of the invention is to provide a cutting torch tip having a gas passage therethrough, the lower end of which passage is diametrically reduced so as to form a discharge passage, and having the passage wall so formed as to produce turbulence in the flow of gas just before it issues from the torch tip in the form of a jet which will diverge as the result of the turbulence.

A further object of the invention is to provide a very simple torch tip construction in which the discharge passage is formed in an insertable and replaceable bushing and it is a feature of my invention to incorporate the turbulence producing means with the bushing, thus making it possible to change the characteristics of the jet from a cutting torch by merely replacing the bushing by one of required characteristics.

Further objects and advantages of the invention will be made evident throughout the following part of the specification.

Referring to the drawing, which is for illustrative purpose only,

Fig. 1 is a vertically sectioned fragmentary view to enlarged scale, showing a preferred embodiment of my invention.

Fig. 2 is a perspective view of the replaceable bushing, illustrated in Fig. 1.

Figs. 3, 4, 5 and 6 are fragmentary sectional views showing alternative forms of replaceable bushings, having the upper ends thereof so formed as to produce turbulence in the flow of gas and divergence in the jet which issues from the cutting torch.

Fig. 7 is a fragmentary sectional view showing a replaceable bushing, having diagonal and tangential passages in the upper end thereof for producing a turbulent condition in the flow of gas which is to issue in the form of a diverging cutting jet.

Fig. 8 is a slightly enlarged plan view of the bushing shown in Fig. 7.

Fig. 9 is a fragmentary sectional view showing an alternative means for producing turbulence by rotation of the flow of gas through the discharge opening of the cutting tip.

Fig. 10 is a fragmentary sectional view in which the turbulence-producing wall formation adjacent to the discharge mouth of the bushing is near the lower end of the bushing.

As shown in Fig. 1, my invention is adapted to the general form of cutting tip having circularly disposed longitudinal passages for a combustible gas mixture for producing pre-heating flames by which the metal to be cut by an oxygen jet is raised to the required temperature for sustaining combustion of metal in the presence of oxygen. Accordingly, in Fig. 1, I show a tip 12 having a central passage 13 for oxygen and surrounding ducts 14 through which an oxyacetylene gas mixture is fed to heating flames 15.

In the lower end of the gas passage 13 a bushing 16 is inserted, this bushing having a discharge opening, or passage, 17, extending axially therethrough which is of smaller diameter than the passage 13 and is of such diameter that a jet of a size to cut a required width of slot will issue therefrom. The discharge passage 17 may be considered as the restricted lower end of the gas passage 13.

As shown in Fig. 2, the upper end 18 of the bushing 16 is deformed for the purpose of producing turbulence in the flow of gas through the discharge passage 17. This deformation consists in cutting away a portion of the upper end 18 at one side of a diametral line so as to produce a semicircular end 20 and a semicircular end area 21 downwardly offset therefrom.

When the upper end of the bushing 16 is notched or stepped in the manner shown a condition of turbulence will be produced in the flow of gas which will result in the cutting jet 22 issuing from the tip 12 being diverged in substantially the manner shown so that the walls 23 of a slot 24 cut by such jet in a plate 25 will diverge downwardly.

As shown in Fig. 1, a portion of the gas flowing through discharge passage 17 enters the upper end of such passage as indicated by an arrow 26 and the remaining portion of the gas must enter the upper end of the passage 17 from a lower level, or offset position, the meeting of these component parts of the flow of gas producing turbulence. It is thought that the turbulent action results from a portion of the gas entering the passage 17 in axial direction, as indicated by the arrow 26, being met by gas entering the passage 17 in the general direction indicated by an arrow 27.

Regardless of the above theory, it is found that a bushing formed as shown in Figs. 1 and 2 and as shown in the remaining figures of the drawing, will produce turbulence which will result in divergence of the cutting jet issued by the cutting torch tip, and it is found that this turbulence may be controlled so as to vary the divergence of the cutting jet within practical limits.

The form of the invention shown in Fig. 3 employs a bushing 16a having a discharge passage 17. The upper end of the bushing 16a is deformed, or offset by extending a slot 28 thereacross, this slot 28 being positioned preferably on a diameter of the bushing, as indicated in Fig. 3.

In Fig. 4 I show a bushing 16b set into the lower end of the gas passage 13 of a torch tip 12, this bushing having a V-shaped groove, or depression, 30 cut diametrically across the upper end thereof so as to produce an offset relationship between the various portions of the upper end of the bushing 16b.

In Fig. 5 a bushing 16c is shown with the upper end 18 thereof chamfered diagonally on each side of a diametral line so as to produce sloping faces 31. This deformation of the end wall of the bushing 16c also produces turbulence which will cause divergence of the cutting jet which issues from the discharge passage 17 of the bushing 16c.

Fig. 6 shows a bushing 16d having a plurality of V-shaped notches 32 cut radially in the upper end thereof, through which notches 32 the component portions of the flow of gas enter the discharge passage 17 in offset relationship thereby creating divergence-producing turbulence in the flow of gas.

In Fig. 1 to Fig. 6 I have shown a cutting torch tip having a gas passage reduced in diameter through a short distance adjacent to its discharge end.

In each form of the invention disclosed in these figures the wall of the discharge passage is so formed at a point adjacent to its lower end that turbulence will be produced in the flow of gas at such short distance from the lower end of the discharge passage that the gas will issue in turbulent condition and produce divergence of the cutting jet so formed. To produce this wall deformation by deforming the bushings 16, 16a, 16b, 16c, and 16d is apparently the most simple form of construction by which the principles of the invention may be practiced but it is recognized that the walls, or metal portions represented by the torch tip 12 and the bushings 16, 16a, 16b, 16c, and 16d may be integrally formed, although such construction would be considerably more expensive than that which I have adopted.

Fig. 7 shows a bushing 16e, having the upper end 18 thereof substantially flat and radial. Drilled diagonally and tangentially downwardly from the upper face 18 of the bushing 16e are holes 35 which introduce gas tangentially into the discharge passage 17 to meet with the axial flow of gas therethrough in such a manner as to rotate the flow of gas which is passing through the discharge passage 17, producing therein a condition which will cause the issuing jet 22 to diverge in the desired manner.

I have also found that by placing a spiral plate 37 in the gas passage 13, as shown in Fig. 9, so as to rotate the flow of gas which must enter the discharge passage of the bushing I am able to produce divergence of the issuing jet 22, this divergence of the jet 22 being caused possibly by a combination of rotation and turbulence in the flow of gas, or by either of these conditions separately.

In Fig. 9 I have also shown how the interior wall of the bushing 16f may be rifled, as indicated at 38, so as to impart a rotational and turbulent condition to the gas which is flowing through the discharge pipe 17. The member 37 and the rifling 38 may be employed together or separately, depending upon the character of cutting jet required.

In the form of my invention shown in Fig. 10 the bushing 16g is provided with a discharge passage 17g defined by an interior cylindrical wall surface 40 which extends downwardly from the upper end of the bushing to a plane 41 adjacent the lower or discharge end of the bushing. The walls of the discharge passage 17g are then directed conically inwardly so as to produce a discharge mouth 42 at the lower end of the passage 17g having a diameter considerably less than that of the discharge passage 17g. The very abrupt reduction in the diameter of the discharge passage 17g at its lower end produces a turbulence in the flow of gas and accomplishes the desired divergence of the cutting jet 22 which issues from the discharge mouth 42.

I have found that where the pressure of gas is properly proportioned with respect to the diameter of a short discharge passage, such as the passage 17g, a simple radial shoulder at the upper end of the discharge passage will produce turbulence and likewise a small amount of divergence in the issuing jet.

This construction however provides no means for regulating the divergence of the jet, especially in view of the fact that the pressure of gas employed in the cutting jet must be controlled relative to the thickness and character of the metal being cut; therefore it is desirable to employ a wall deformation, such as I have clearly exemplified, for producing and controlling turbulence and jet divergence.

Although I have shown a simple and practical embodiment of my invention it is recognized that some of the elements thereof may be replaced by other elements capable of performing the same functions in a substantially equivalent manner; therefore the inventions are not to be limited by the details of the foregoing disclosure but should be accorded the full scope of the following claims.

I claim as my invention:

1. A cutting tip of the character described having a gas passage terminating in a discharge mouth and means in said gas passage adjacent to said discharge mouth for producing sufficient turbulence in the flow of gas which issues from said discharge mouth to produce a diverging cutting jet which will cut a slot having diverging walls.

2. A cutting tip of the character described having a gas passage terminating in a discharge mouth and walls in said gas passage adjacent to said discharge mouth so formed as to produce sufficient turbulence in the flow of gas which issues from said discharge mouth to produce a diverging cutting jet which will cut a slot having diverging walls.

3. A cutting tip of the character described having a gas passage extending between the upper and lower ends thereof and a bushing inserted in the lower end of said gas passage, said bushing having a discharge opening communicating with said gas passage and having the walls thereof so formed as to produce sufficient turbulence in the flow of gas through said discharge opening to produce a diverging cutting jet which will cut a slot having diverging walls.

4. A cutting tip of the character described having a gas passage extending between the upper and lower ends thereof and a bushing inserted in the lower end of said gas passage, said bushing having a discharge opening communicating with said gas passage and having its inner end so formed as to produce sufficient turbulence in the flow of gas through said discharge opening to produce a diverging cutting jet which will cut a slot having diverging walls.

5. A cutting tip of the character described having a gas passage extending between the upper and lower ends thereof and a bushing inserted in the lower end of said gas passage, said bushing having a discharge opening communicating with said gas passage and having a shoulder at its upper end for producing sufficient turbulence in the flow of gas through said discharge opening to produce a diverging cutting jet which will cut a slot having diverging walls.

6. A cutting tip of the character described having a gas passage extending between the upper and lower ends thereof and a bushing inserted in the lower end of said gas passage, said bushing having a discharge opening therethrough of smaller diameter than said gas passage and a shoulder at its upper end for producing sufficient turbulence in the flow of gas through said discharge opening to produce a diverging cutting jet which will cut a slot having diverging walls.

7. A cutting tip of the character described having a gas passage extending between the upper and lower ends thereof and a bushing inserted in the lower end of said gas passage, said bushing having a discharge opening therethrough of smaller diameter than said gas passage and having a shoulder for producing sufficient turbulence in the flow of gas through said discharge opening to produce a diverging cutting jet which will cut a slot having diverging walls.

8. A cutting tip of the character described having a gas passage extending between the upper and lower ends thereof, there being a relatively short portion at the lower end of said passage reduced in diameter so as to form a discharge passage terminating in a discharge mouth; and means cooperative with said discharge passage for producing sufficient turbulence in the flow of cutting gas therethrough whereby to cause divergence in the gas jet issuing from said discharge mouth.

9. A cutting tip of the character described having a gas passage extending between the upper and lower ends thereof, there being a relatively short portion at the lower end of said passage reduced in diameter so as to form a discharge passage terminating in a discharge mouth; the inner walls of said cutting tip being formed adjacent the lower end thereof to produce turbulence in the flow of gas through said discharge passage whereby to cause divergence in the gas jet issuing from said discharge mouth.

10. A cutting tip as defined in claim 1, in which said means consists of a wall having a discharge opening therethrough of smaller diameter than the portion of said gas passage adjacent said wall, there being a shoulder at the inner end of said wall so formed as to admit cutting gas from said gas passage into said opening at different distances from the mouth of said opening whereby to produce the required turbulence in the cutting gas passing through and issuing from said opening.

11. A cutting tip as defined in claim 1, in which said means consists of a wall having a discharge opening therethrough of smaller diameter than the portion of said gas passage adjacent said wall, there being a notched shoulder at the inner end of said wall for admitting cutting gas from said gas passage into said opening at different distances from the mouth of said opening whereby to produce the required turbulence in the cutting gas passing through and issuing from said opening.

12. A cutting tip as defined in claim 1, in which said means consists of a wall having a discharge opening therethrough of smaller diameter than the portion of said gas passage adjacent said wall, there being a stepped shoulder at the inner end of said wall for admitting cutting gas from said gas passage into said opening at different distances from the mouth of said opening whereby to produce the required turbulence in the cutting gas passing through and issuing from said opening.

13. A cutting tip as defined in claim 1, in which said means consists of a wall having a discharge opening therethrough of smaller diameter than the portion of said gas passage adjacent said wall, there being a V-shaped shoulder at the inner end of said wall for admitting cutting gas from said gas passage into said opening at different distances from the mouth of said opening whereby to produce the required turbulence in the cutting gas passing through and issuing from said opening.

14. A cutting tip as defined in claim 1, in which said means consists of a wall having a discharge opening therethrough of smaller diameter than the portion of said gas passage adjacent said wall, there being a diametrally ridged shoulder at the inner end of said wall for admitting cutting gas from said gas passage into said opening at different distances from the mouth of said opening whereby to produce the required turbulence in the cutting gas passing through and issuing from said opening.

In testimony whereof, I have hereunto set my hand at Los Angeles, California, this 10th day of April, 1930.

CLARENCE J. COBERLY.